(12) United States Patent
Voigtländer et al.

(10) Patent No.: US 7,688,252 B2
(45) Date of Patent: Mar. 30, 2010

(54) RADAR SYSTEM, IN PARTICULAR FOR MEASURING DISTANCE AND/OR SPEED

(75) Inventors: Klaus Voigtländer, Wangen (DE); Matthias Karl, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 11/667,511

(22) PCT Filed: Sep. 14, 2005

(86) PCT No.: PCT/EP2005/054572
§ 371 (c)(1),
(2), (4) Date: Nov. 6, 2007

(87) PCT Pub. No.: WO2006/051015
PCT Pub. Date: May 18, 2006

(65) Prior Publication Data
US 2008/0198065 A1    Aug. 21, 2008

(30) Foreign Application Priority Data
Nov. 11, 2004   (DE) .................. 10 2004 054 466

(51) Int. Cl.
G01S 13/58   (2006.01)
G01S 13/00   (2006.01)
G01S 13/08   (2006.01)

(52) U.S. Cl. .................. 342/109; 342/70; 342/104; 342/118; 342/157

(58) Field of Classification Search ............ 342/70–73, 342/89, 109, 147, 175, 157
See application file for complete search history.

(56) References Cited

U.S. PATENT DOCUMENTS 6,362,777 B1 *   3/2002   Kawakami et al. .......... 342/131
6,473,056 B2 * 10/2002   Annamaa ................... 343/895
6,703,967 B1 *   3/2004   Kuroda et al. .............. 342/111

FOREIGN PATENT DOCUMENTS

DE           100 11 263        9/2001

(Continued)

OTHER PUBLICATIONS

Compact multibeam dual-frequency (24 and 77 GHz) imaging antenna for automotive radars, Schoenlinner, B. Ebling, J.P. Kempel, L.C. Rebeiz, G.M. , Michigan State University;Microwave Conference, 2003. 33rd European, Oct. 7-9, 2003, vol. 2, on pp. 785-788 vol. 2.*

(Continued)

Primary Examiner—Thomas H Tarcza
Assistant Examiner—Peter M Bythrow
(74) Attorney, Agent, or Firm—Kenyon & Kenyon LLP

(57) ABSTRACT

In a radar system, harmonic excitation of an antenna is carried out in different frequency ranges. The antenna characteristic which varies as a function thereof is used to analyze different solid angle ranges around an object.

15 Claims, 5 Drawing Sheets

FOREIGN PATENT DOCUMENTS

| | | |
|---|---|---|
| DE | 102 53 808 | 7/2004 |
| DE | 102 61 027 | 7/2004 |
| DE | 103 53 686 | 6/2005 |

OTHER PUBLICATIONS

Millimeter-wave harmonic space diversity active integrated antenna with microwave injection locking Adachi, T. Kobayashi, J. Kawasaki, S. Urabe, H. Iwasaki, K., Dept. of Commun. Eng., Tokai Univ., Kanagawa; Microwave Conference, 2000 Asia-Pacific, 2000, pp. 1506-1509,Meeting Date: Dec. 3, 2000.*

Schoenlinner B. et al; "Compact Multibeam Dual-Frequency Imaging Antenna For Automotive Radars"; Microwave Conference, 2003, $33^{rd}$ European Oct. 7-9, 2003; pp. 785-788.

* cited by examiner

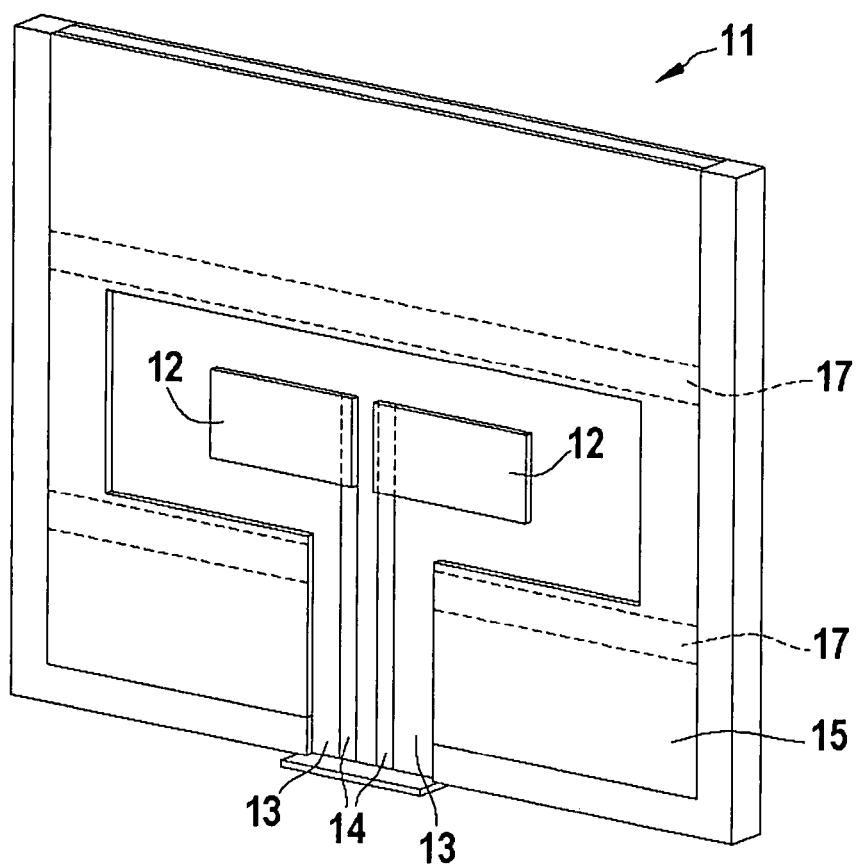
Fig. 4
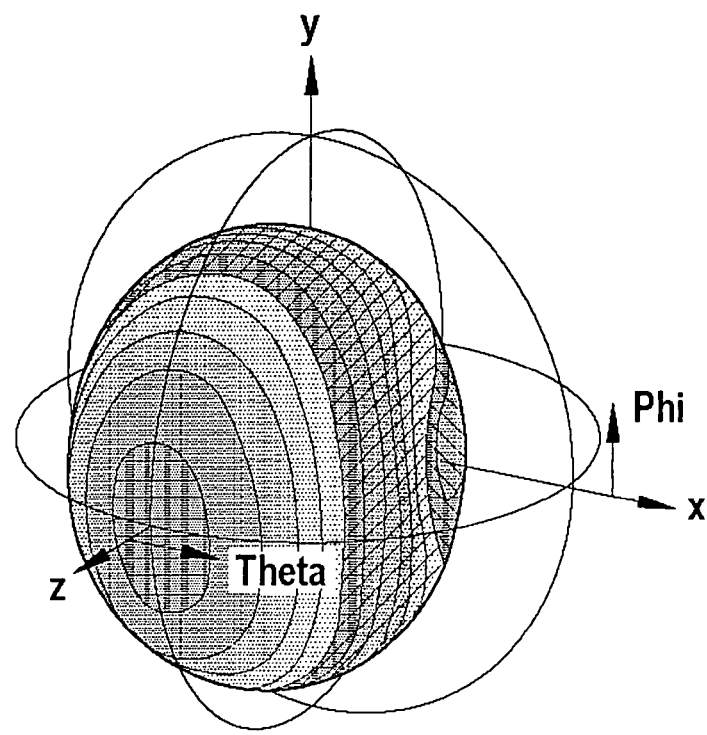
Fig. 5
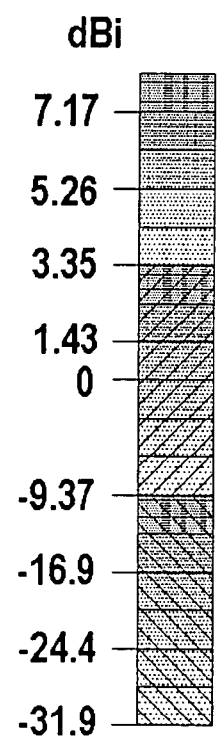

RADAR SYSTEM, IN PARTICULAR FOR MEASURING DISTANCE AND/OR SPEED

FIELD OF THE INVENTION

The present invention is directed to a radar system, in particular for measuring distance and/or speed in motor vehicles, in which harmonics of a fundamental frequency are used.

BACKGROUND INFORMATION

A pulse-Doppler radar system for measuring distance or speed in a motor vehicle is described in U.S. Pat. No. 6,362,777. Therein, a multiplier or a mixer is provided in the transmit path for supplying a signal having double the frequency of a reference oscillator to the transmitting antenna. Frequency doubling is carried out there in order to be able to use a reference oscillator having a lower frequency and thus more stable behavior.

SUMMARY OF THE INVENTION

Using principles of the present invention, i.e., the varying antenna characteristic resulting from harmonic excitation of the same antenna in different frequency ranges is used to analyze various solid angle ranges around an object, different radar analyses are possible without changing the hardware.

Instead of using a plurality of radar sensors for different applications, e.g., long-range radar, short-range radar, park assist systems, stop and go, etc., different applications using just one radar sensor may be implemented via the measures according to the present invention.

Frequency generation and modulation are achievable at lower frequencies in a cost-effective and stable manner. Just one frequency multiplier is required, which may have active or passive circuits. The amplifiers and mixers required may either be switched over within the frequency, or advantageously have a broadband design without switch-over. For the mixer, simple and thus cost-effective sub-harmonic mixer designs may be used. In the case of speed measurement, the Doppler effect is multiplied. The dynamic range may therefore be reduced or expanded.

Harmonic excitation of the same antenna constitutes a particular advantage. Usually, resonant antennas are one half of a wavelength long. They may nonetheless be excited on all harmonics. The radiation angle then varies with higher order (from perpendicular in the direction of wire/patch). Thus in the case of vehicle systems used for all-round view, the area in front of the vehicle may be covered at the lower frequency, and additionally the area to the side at the higher frequency. By optimizing the design and phase position it is possible to cover any desired direction. Furthermore, a plurality of basic elements (dipole/patch) may be used for the antenna system to achieve the desired power and antenna characteristic.

BRIEF DESCRIPTION OF THE DRAWINGS

FIG. 4 shows a view of the antenna system shown in FIG. 2 with the patch removed.

FIG. 5 shows an antenna characteristic when excited using the fundamental wave.

DETAILED DESCRIPTION

Figure 1:
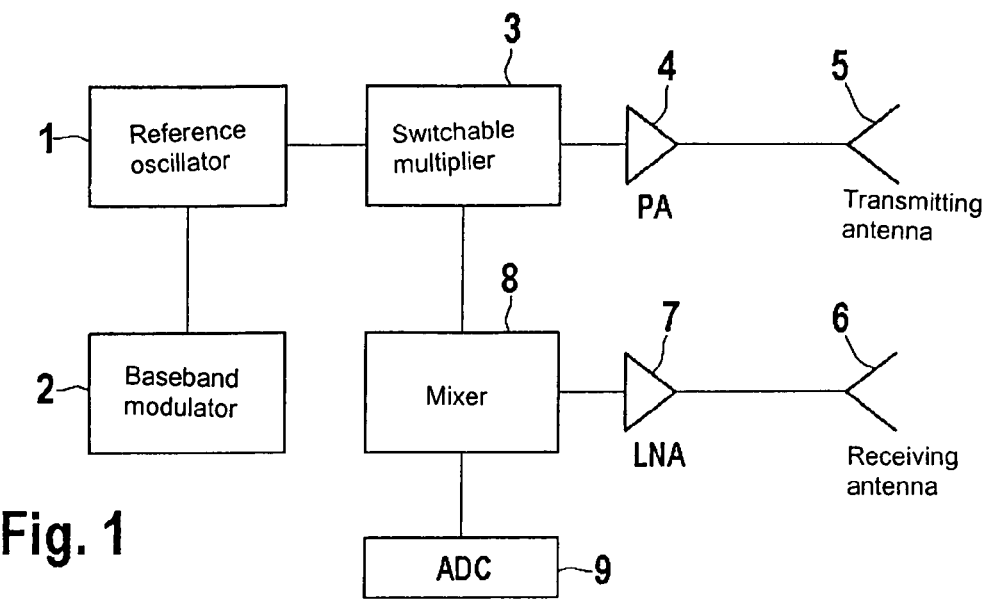
FIG. 1 shows a block diagram for a multiple-frequency radar system.

For the radar system according to the present invention, a system as shown in FIG. 1 is advantageously used. A reference oscillator 1, which is modulated by a baseband modulator 2, is connected to transmitting antenna 5 via a switchable frequency multiplier 3 and downstream amplifier 4. The received radar signal, which is reflected off at least one object, passes from receiving antenna 6 to a down mixer 8 via a low noise amplifier 7 (LNA=low noise amplifier). Using the output signal of frequency multiplier 3, the down mixer converts the received antenna signal into a low-frequency analysis signal, which is subjected to further processing in unit 9, in particular via analog-digital conversion. Like amateur radio practices, the frequency ranges in which the radar system according to the present invention operates utilize the harmonics, the bands 3.5, 7, 14, 21, and 28 MHz as well as 144, 432, and 1296 MHz being used. Frequency generation and modulation advantageously are carried out at low frequencies (fundamental wave). Only frequency multiplier 3 and mixer 8 and the amplifiers need to be designed to handle high-frequency signals. They may either be switchable within the frequency, or advantageously have a broadband design without switch-over. For mixer 8 cost-effective sub-harmonics mixer designs may also be used. The radar system may operate via pulse, continuous wave (CW), frequency modulated CW (FMCW), or via mixed types of operation. For pulse operation, a controlled switch is required in the transmit path, and in the receive path a switch of the same type is also required, this being operable relative to the switch in the transmit path subject to a delay equal to the propagation time of the radar pulse for a predefined distance zone.

Figure 2:
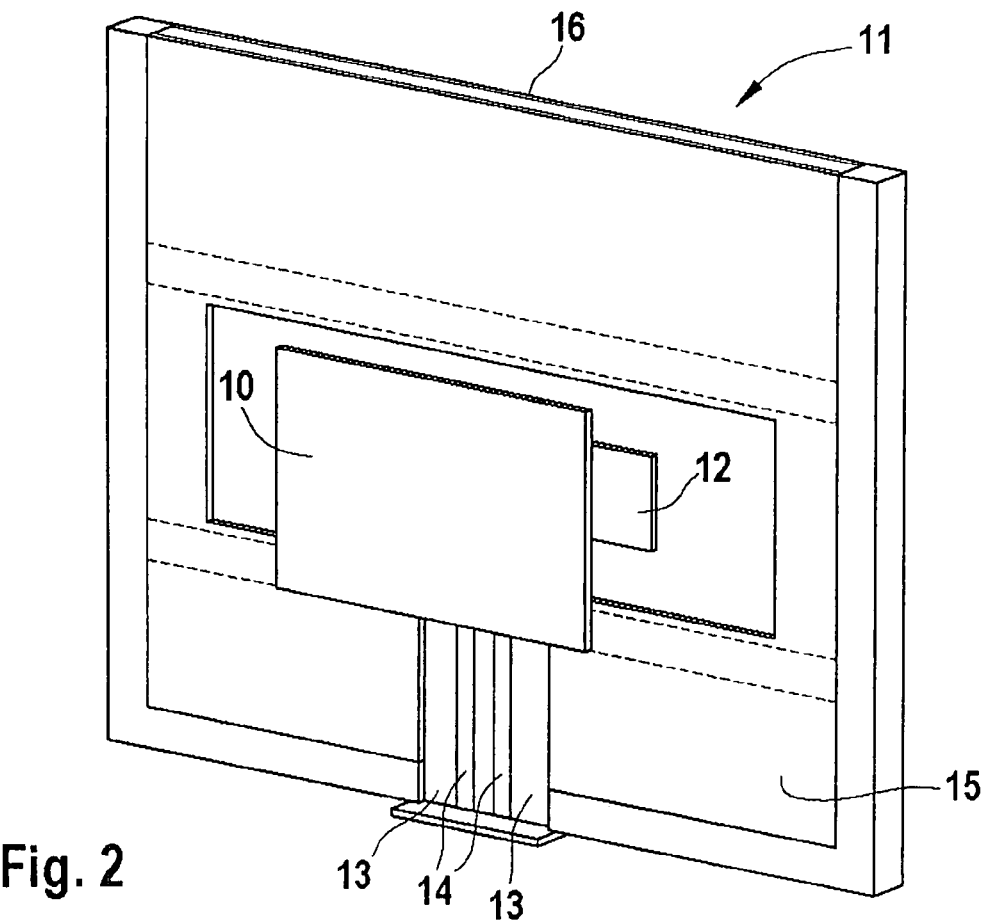
FIG. 2 shows a broadband layered antenna for use in the radar system shown in FIG. 1.

A broadband layered antenna having a transmitting and/or receiving dipole, in front of which an electrically coupled patch element is located at a predefined distance from the dipole, is suitable as the transmitting and/or receiving antenna. FIG. 2 shows the basic design of such an antenna system, which is described in detail in German Patent No. DE 103 53 686.3. Patch 10, a small rectangular metal plate, is located parallel to the layering of antenna system 11 at a distance of approximately 0.1 times the fundamental wavelength of the transmitted beam at 26 GHz, above flat dipole 12 on the layer configuration. The distance is not limited to the aforementioned dimensioning, but rather may vary. A range of 0.01 to 0.2 times the wavelength is suitable. Patch 10 is for example attached to the device housing (not shown) above and clear of dipole 12, or is attached to dipole 12 via a foam layer (see FIGS. 3 and 4). Dipole 12 includes two separate, symmetrical, rectangular metal surfaces, which are situated on a dielectric substrate 13, e.g., a circuit board, a ceramic material, or a softboard material. The halves of the dipole each have a length of about one quarter of the fundamental wavelength. The wavelength is evaluated not in air but rather as effectively loaded by the dielectric.

Figure 3:
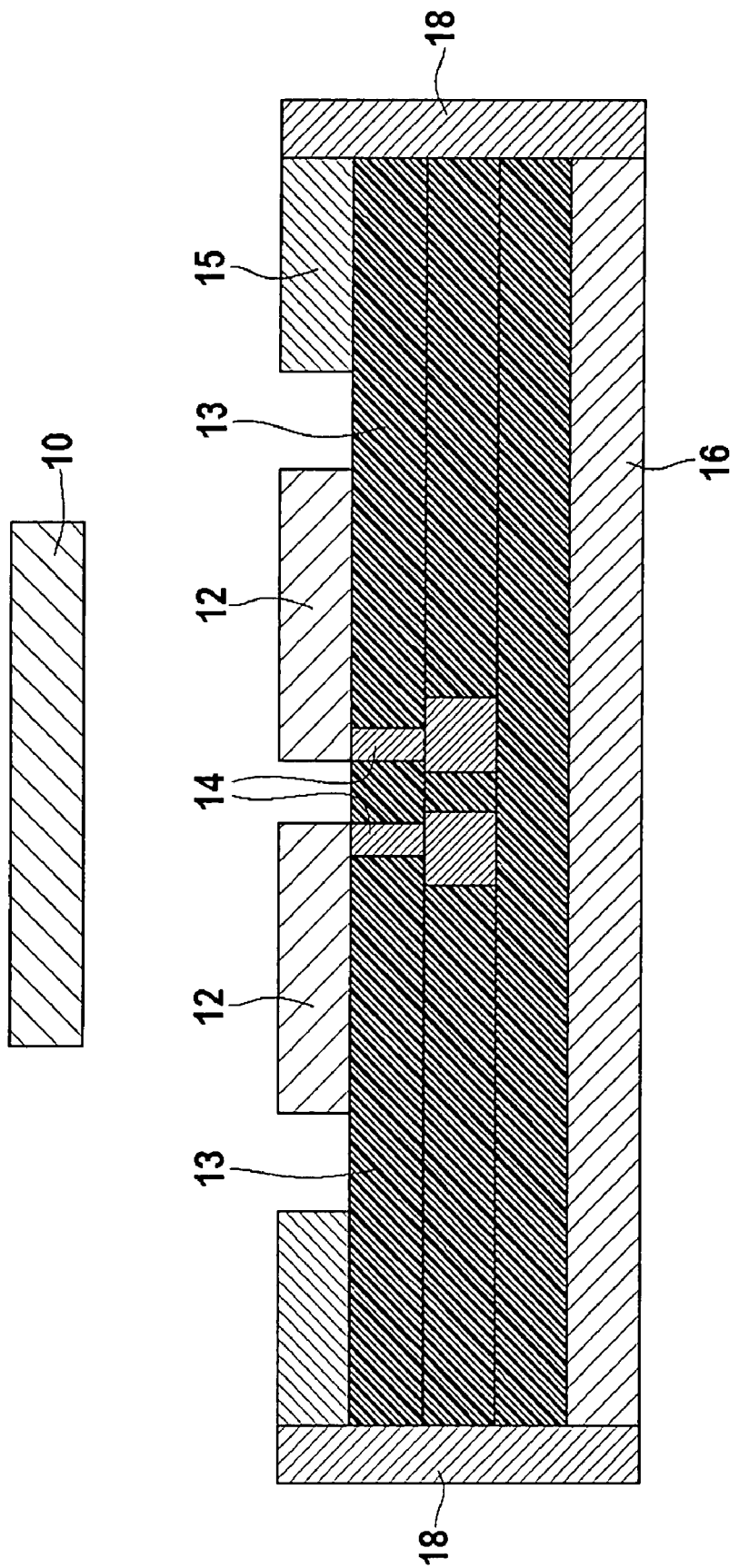
FIG. 3 shows a section of the antenna system shown in FIG. 2.

Each individual dipole half is fed via a signal supply conductor 14 (open two-wire line, known as "chicken-ladder"). The two signal supply conductors 14 are situated parallel to one another and thus form a differential input. They extend across the surface of substrate layer 13 and are for example printed or etched. A metallic ground layer 15, which screens off the radiation, is applied on substrate layer 13, the ground layer having recesses only in the area of signal supply conductors 14 and dipole 12. In addition, screening metallic ground layer 16 covers the entire area of the rear side (not shown) of the antenna system. Dipole 12 and patch 10 are situated parallel to one another, and the two signal supply conductors 14 extend perpendicular thereto. Thus the field vectors of the electrical field of dipole 12, patch 10, and supply conductors 14 are situated parallel to one another and point in the same direction. As shown in FIG. 3, the inner edges of the separate halves of the dipole are in contact with signal supply conductors 14. Metallic chamber strips 17 (indicated by broken lines) are located in the layers beneath ground layer 15, and extend to rear-side ground layer 16. These chamber strips 17 conductively connect the two outer ground layers 18 and surround dipole 12 except for a through-opening for signal supply conductors 14. This ground screening largely suppresses lateral radiation. The surrounding chamber strips 17 are at a distance from dipole 12 of one quarter of the wavelength of the transmitted radiation. Radiation beamed into substrate 13 is reflected off chamber strips 17 and fed back in the correct phase sequence.

The resonant length of patch 10 is from left to right. In contrast to ordinary patch antennas the patch is longer than it is wide here. On the fundamental wave the resonant length is one half of a wavelength. In the case of excitation on harmonics of this fundamental wave, at approximately 26 GHz, the radiation angle varies with higher order. The resonant length(s) of the dipole and/or the patch element(s) is/are then greater than one half of the operating wavelength. Thus for vehicle systems used for all-round view, excitation in a low frequency range provides coverage in front of the vehicle, i.e., distances to objects in a direction perpendicular to the antenna exciter surface may be measured, and at higher harmonics of the fundamental frequency solid angle ranges to the side of the vehicle may also be analyzed. This is advantageous in particular for park assist systems or for determining the distance to the edge of the lane. By optimizing the design and phase position it is possible to cover any desired direction. Furthermore, a plurality of basic elements (dipole/patch) may be used for the antenna system to achieve the desired power and antenna characteristic. Moreover, antenna characteristics having differing harmonic frequency ranges may also be used to provide a joint analysis profile. In this case, for example, the analysis profile is stored during excitation on the fundamental frequency and correlated with a current analysis profile on a higher harmonic frequency. Further harmonics may be used for harmonic excitation of the antenna, e.g., N=1, 2, 3 or N=1, 3, 5 or N=1, 2, 4, 8 etc., or alternatively it is possible to use only harmonics and not the fundamental wave, e.g., N=2, 3 or N=3, 5.

Figure 6:
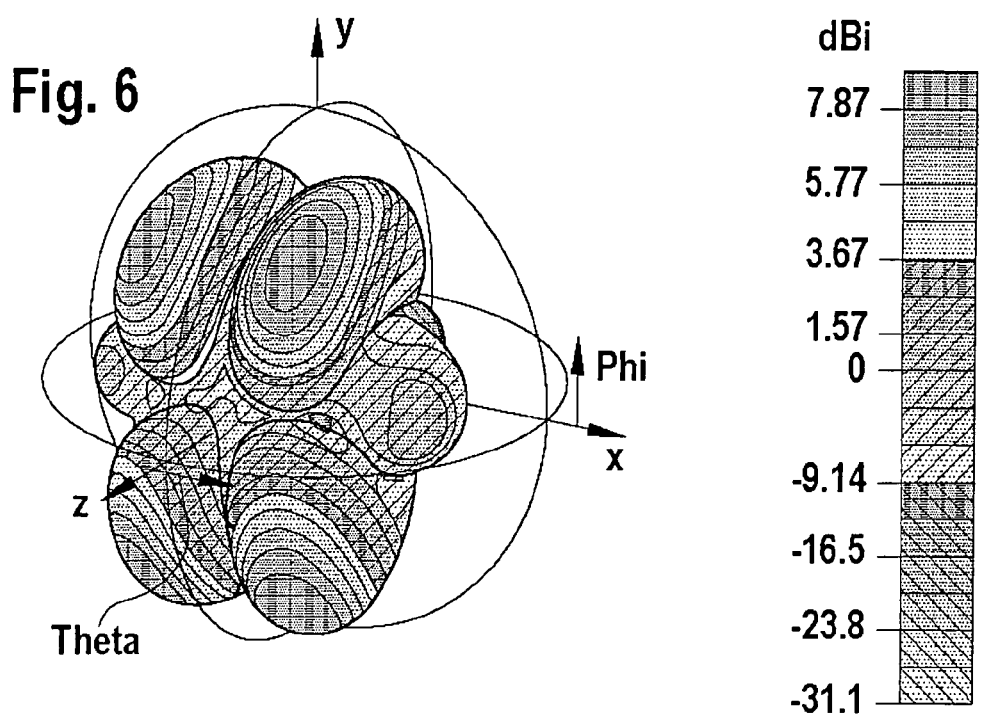
FIG. 6 shows an antenna characteristic when excited using the third harmonic.

To set the desired degree of multiplication N, frequency multiplier 3 and if necessary down mixer 8 are controlled accordingly by unit 9. The antenna characteristic of the above-described antenna with regard to the fundamental wave, i.e., at about 26 GHz, is shown in FIG. 5. In the case of the fundamental wave, the patch beams forward (z direction) perpendicular to the patch surface. The gain relative to an omnidirectional radiator in the z direction is 8.18 dBi. No lateral minor lobes are created. In the case of higher direct harmonic excitation, this direction occupies a zero position, and the radiation is shifted based on an angle determined by harmonic number N. FIG. 6 shows the antenna characteristic in the case of excitation on the third harmonic at approximately 78 GHz. Four main lobes are created, which are rotated by a fixed angle symmetrically relative to the z direction, as well as smaller minor lobes.

Figure 7:
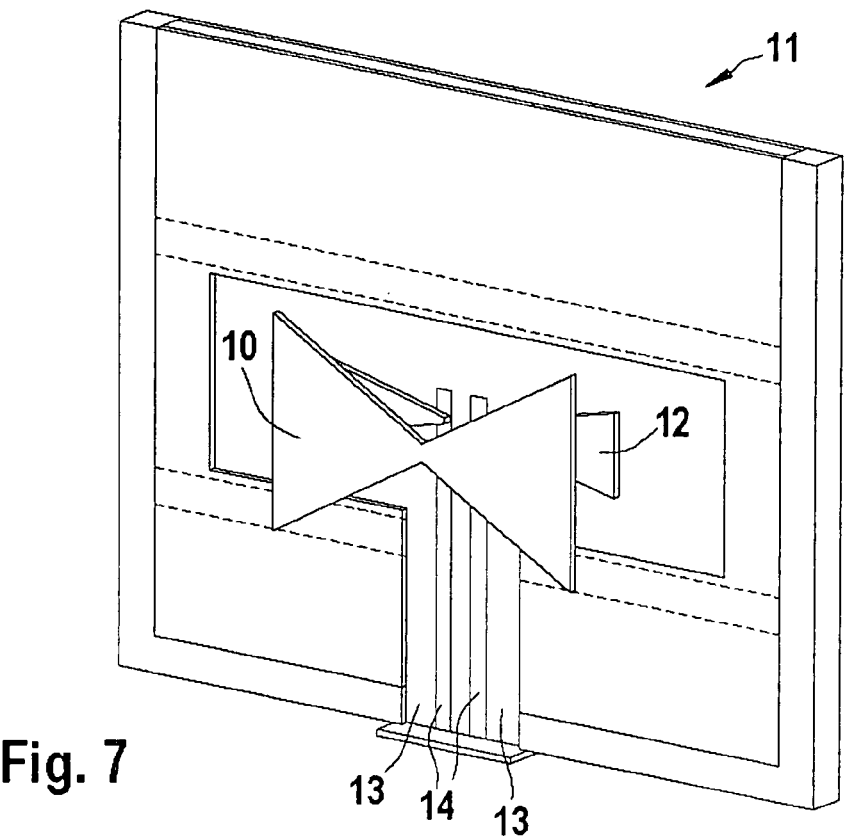
FIGS. 7, 8 and 9 show embodiments of broadband biconical antennas.
Figure 8:
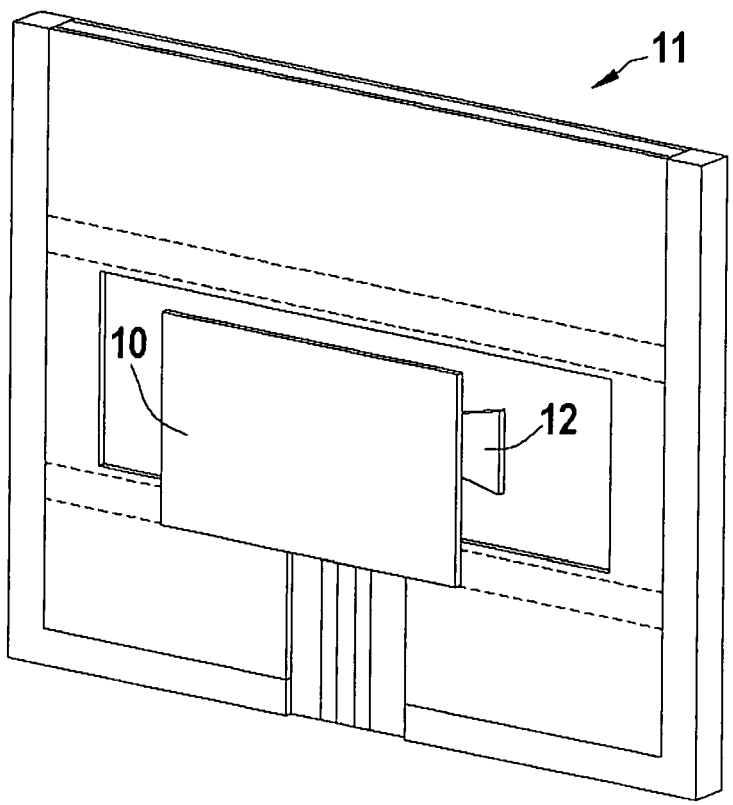
Figure 9:
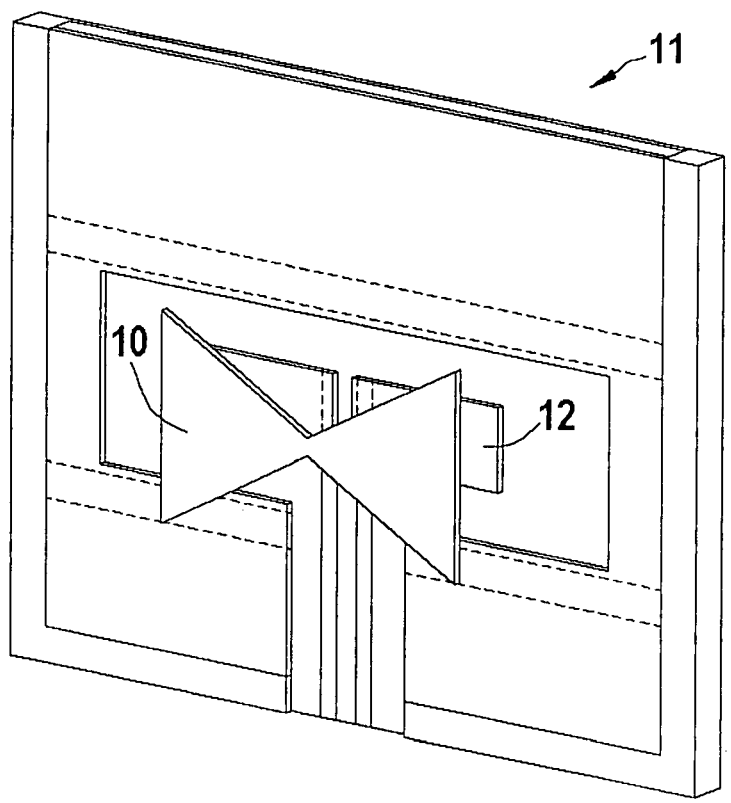

The antenna's bandwidth may be increased by designing the dipole and/or patch element as biconical, which is advantageous in particular in the case of excitation using higher harmonics, since the modulation signal is also multiplied. Exemplary embodiments of this kind are shown in FIGS. 7 through 9. In FIG. 7, patch 10 and dipole 12 are both biconical. In FIG. 8, dipole 12 is biconical and the patch is rectangular. In FIG. 9, patch 10 is biconical and dipole 12 is rectangular.

The above-described patch configurations are merely examples, and many other types are possible, e.g., individual patch, coupled patches, waveguide radiators, printed wires or surfaces etc. Asymmetrical excitations are also possible.

What is claimed is:

1. A radar system which is based on a use of harmonics of a fundamental frequency, comprising:
    a broadband layered antenna having at least one of a transmitting dipole and a receiving dipole;
    a reference oscillator connected to the antenna by a switchable frequency multiplier and a downstream amplifier;
    an electrically coupled patch element located parallel to the antenna, wherein the patch element is situated away from the dipole; and
    an arrangement for using a varying antenna characteristic resulting from a harmonic excitation of a the antenna in different frequency ranges to analyze solid angle ranges around an object.

2. The radar system according to claim 1, wherein the radar system is for measuring at least one of a distance and a speed in a motor vehicle.

3. The radar system according to claim 1, wherein, when the antenna is excited in a low frequency range, distances to objects in a direction perpendicular to a surface of an antenna exciter are measured.

4. The radar system according to claim 2, wherein, when the antenna is excited in a high frequency range, objects in areas to a side of the vehicle are detected.

5. The radar system according to claim 1, wherein the antenna includes a plurality of antenna exciters, which, with regard to a power radiated and a phase, are adjusted for a desired solid angle analysis.

6. The radar system according to claim 1, wherein solid angle ranges analyzed in harmonic frequency ranges which differ relative to one another are combined to produce a joint analysis profile.

7. The radar system according to claim 1, wherein the at least one dipole is situated on a dielectric carrier, which is surrounded by a screening layer.

8. The radar system according to claim 1, wherein a length of at least one of a resonant dipole and the patch element is greater than one half of an operating wavelength.

9. The radar system according to claim 1, wherein the at least one dipole and the patch element are situated relative to one another in such a way that vectors of an electrical field in the at least one dipole and the patch element are parallel and have a same direction.

10. The radar system according to claim 1, wherein the at least one dipole is in two parts, and its feed line includes an open two-wire line, which is also situated on a dielectric carrier.

11. The radar system according to claim 1, wherein at least one of (a) the at least one dipole and (b) the patch element is biconical.

12. The radar system according to claim 1, wherein the switchable frequency multiplier is situated in a transmit path, for harmonically exciting the antenna.

13. The radar system according to claim 12, further comprising a down mixer situated in a receive path, which uses an output signal of the switchable frequency multiplier to convert a receive antenna signal into a low-frequency analysis signal.

14. The radar system according to claim 1, wherein the patch element is attached above and clear of the dipole at a predefined distance.

15. The radar system according to claim 1, wherein the patch is attached to the dipole by a foam layer.

* * * * *